United States Patent
Seesink

(10) Patent No.: US 7,571,065 B2
(45) Date of Patent: Aug. 4, 2009

(54) METHOD AND APPARATUS FOR CALIBRATION OF SENSOR SIGNALS

(75) Inventor: Peter H Seesink, Ouddorp (NL)

(73) Assignee: Kavlico Corporation, Moorpark, CA (US)

( * ) Notice: Subject to any disclaimer, the term of this patent is extended or adjusted under 35 U.S.C. 154(b) by 0 days.

(21) Appl. No.: 11/754,971

(22) Filed: May 29, 2007

(65) Prior Publication Data

US 2008/0300810 A1    Dec. 4, 2008

(51) Int. Cl.
G01R 35/00 (2006.01)
(52) U.S. Cl. ...................................................... 702/85
(58) Field of Classification Search ................ 702/85
See application file for complete search history.

(56) References Cited

U.S. PATENT DOCUMENTS

| | | | |
|---|---|---|---|
| 4,190,796 A | 2/1980 | Ishii | |
| 4,743,836 A | 5/1988 | Grzybowski | |
| 5,471,884 A | 12/1995 | Czarnocki | |
| 5,604,685 A | * 2/1997 | Seesink et al. | ................ 702/86 |
| 5,633,594 A | 5/1997 | Okada | |
| 7,398,173 B2 | * 7/2008 | Laraia et al. | ................... 702/99 |

\* cited by examiner

Primary Examiner—Bryan Bui
Assistant Examiner—Jonathan Teixeira Moffat
(74) Attorney, Agent, or Firm—Jeffer Mangels Butler & Marmaro LLP

(57) ABSTRACT

A method is disclosed for providing calibration of sensor signals in a sensor having a measuring sensor and a reference sensor. The method includes receiving a sensor signal and a reference signal from the measuring sensor and the reference sensor, respectively. The method further includes providing a first compensation signal to the sensor signal based on a gain characteristic and providing a second compensation signal to the reference signal based on the gain characteristic and an offset characteristic; combining the first compensation signal and the sensor signal, and the second compensation signal and the reference signal to create a compensated sensor signal; and, adjusting the compensated signal for temperature effects by coupling a component having a high thermal coefficient to the sensor. An apparatus is also described herein.

11 Claims, 3 Drawing Sheets

METHOD AND APPARATUS FOR CALIBRATION OF SENSOR SIGNALS

BACKGROUND

1. Field

The present invention relates generally to calibration of sensors, and more particularly, to a method and apparatus for calibration of sensor signals.

2. Background

Currently there are many different types of sensors. Often times, the sensors have output signals that need to be adjusted or "conditioned" to remove any anomalous or otherwise unwanted effects. For uniformity of application of a particular design, it is desirable that the output signals for these sensors are consistent from sensor to sensor. However, differences introduced by the manufacturing of the sensors will cause variation in the operating response of the sensors. Further, external environmental influences such as temperature will also affect the operating response.

Typically, sensor transducer circuits are used to convert the output signals into linearized and temperature-compensated signals. These linearized and temperature-compensated signals are then calibrated with respect to a certain null level by a calibration process known as an offset or zero calibration process. The output from the offset calibration process is then calibrated against a certain full-scale value by a calibration process referred to as a span or gain calibration process.

Signal conditioning is typically performed either by digital signal processors or by analog signal processors. When the signal conditioning is performed by a digital signal processor, sensor output signals are first converted into digital signals, which are digital representations of the analog format of the sensor output signals. Then, the digital signal processor processes the digital signals using one or more calibration coefficients. The calibration coefficients are stored in digital memory. The corrected digital signals may then be used as input signals for a digital system (e.g. a microprocessor).

Analog signal processors can be split into two main categories—those having digital storage of calibration coefficients and those without. Analog signal processors without digital storage of calibration coefficients calibrate sensor signals through the use of variable resistors such as potentiometers or laser trim resistors. In laser trimming, a laser is used to ablate the resistor material from the substrate, raising its resistor value.

Analog signal processors with digital storage of calibration coefficients include Digital to Analog Converters (DAC's), and can be seen as digital controlled potentiometers. DAC's typically consist of a network of resistors that are digitally routed in such a way to adjust the total resistance the signal will see. Thus, generally, DAC's are used as variable resistors to calibrate the signal.

Sensors tend to have proportionally less and less output gain as pressure is increased. In addition, all sensors have some shift in zero in addition to non-repeatability when subjected to temperature variations. Further, under certain conditions, the sensor output does not change linearly with temperature and a second-order correction term must be incorporated. The result is that sensors have both a linear and a second-order error. Various current sensor transducer circuits provide separate adjustments for signal offset (i.e., a deviation from an expected signal output), span (i.e., the span of the signal output), linearization (i.e., the linearity of the signal output), temperature coefficient (TC)-offset (i.e., the offset based on the TC) and TC-span (i.e., the span based on the TC). Although these circuit arrangements can deal with a wide range of sensor signals, they are typically complex. The complexity of these circuit arrangements increase both design and manufacturing costs.

It is desirable to address the deficiencies of existing approaches to sensor signal compensation in a lower cost and simpler manner.

SUMMARY OF THE PREFERRED EMBODIMENTS

A sensing system is described herein that addresses the compensation of sensor signals based on temperature and nonlinearity. In one preferred embodiment of the present invention, the sensing system includes a capacitative sensor; a reference sensor; a clock generator, and an integration circuit. The integration circuit is coupled to the capacitative sensor and the reference sensor and includes a plurality of switches controlled by the clock generator to selectively combine a gain component and an offset component with outputs from the capacitative sensor and the reference sensor to generate an integrated output. The sensing system also includes a gain circuit receiving the integrated output to combine a gain compensation therewith, the gain circuit including a resistor having a low temperature coefficient characteristic, wherein the gain circuit provides an output, Vout, obeying the following equation:

$$Vout = Vdd * (1/\beta * (Cp - \alpha_R * Cr)/Cp)$$

where:
- Cp is a measured capacitance from the capacitive sensor;
- Cr is a reference capacitance from the reference capacitor;
- $\alpha_R$ is an offset component;
- $\beta$ is a gain component; and
- Vdd is a supply voltage.

In another preferred embodiment, the present invention is embodied in a method for providing calibration of sensor signals in a sensor having a measuring sensor and a reference sensor. The method includes receiving a sensor signal and a reference signal from the measuring sensor and the reference sensor, respectively. The method further includes providing a first compensation signal to the sensor signal based on a gain characteristic and providing a second compensation signal to the reference signal based on the gain characteristic and an offset characteristic; combining the first compensation signal and the sensor signal, and the second compensation signal and the reference signal to create a compensated sensor signal; and, adjusting the compensated signal for temperature effects by coupling a component having a high thermal coefficient to the sensor.

In yet another preferred embodiment, the present invention is embodied in a method for providing calibration of sensor signals that includes a measuring sensor signal and a reference sensor signal. The method includes a) receiving a first signal integrating a charge difference from the measuring sensor signal and the reference sensor signal; b) receiving a second signal integrating a sequence of charge differences of the measuring sensor signal and the reference sensor signal based on the first signal; and, c) providing a feedback signal to the first stage, wherein the feedback signal includes the second signal and a gain characteristic.

In yet another preferred embodiment, the present invention is embodied in a system for providing calibration of sensor signals including a measuring sensor and a reference sensor. The system having a first integration stage circuit for generating a first signal integrating a charge difference from the measuring sensor and the reference sensor; and, a second integration stage circuit for generating a second signal integrating a sequence of charge differences of the measuring sensor signal and the reference sensor signal based on the first signal; wherein the first integration stage circuit receives a feedback signal including the second signal and a gain characteristic.

In yet another preferred embodiment, the present invention is embodied in a method for providing calibration of sensor signals comprising a measuring sensor signal and a reference sensor signal. The method includes: a) generating a plurality of integrated charge difference signals, wherein each integrated charge difference signal is an integrated charge difference between the measuring sensor signal and the reference sensor signal; b) integrating the plurality of integrated charge difference signals; and, c) providing a feedback signal comprising the integrated plurality of integrated charge difference signals and a gain characteristic.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Many sensors have relative constant temperature coefficient (TC) offset, TC-span and non-linear characteristics. In one preferred embodiment of the present invention, fixed TC-offset, TC-span and linearity corrections are coupled to offset and span adjustments, which results in a novel configuration of the sensor transducer circuit as only two variables, offset and span, are left for calibration. This ultimately results in cost savings not only in hardware but especially in calibration cost on the production lines.

Figure 1:
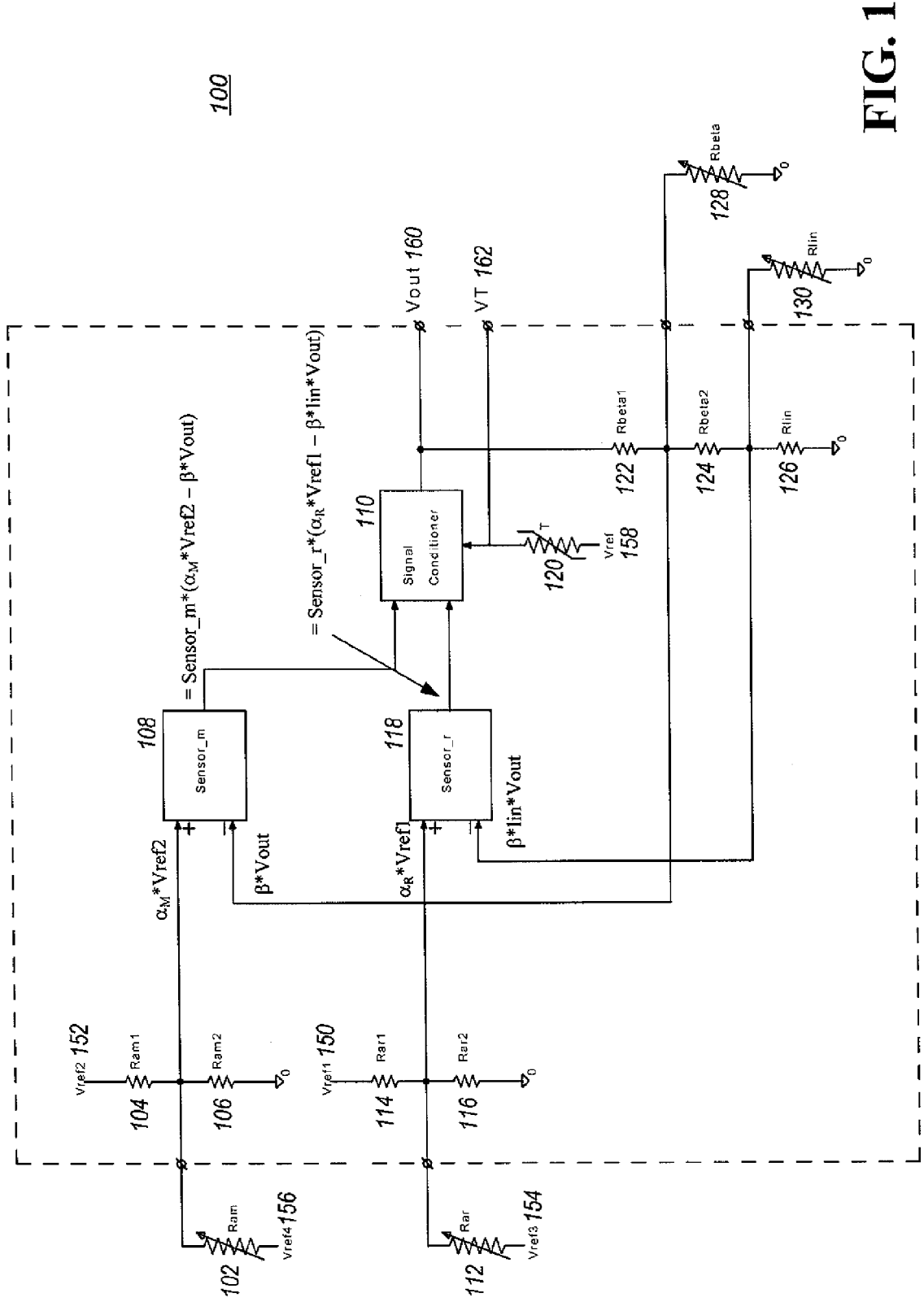
FIG. 1 is a circuit diagram of a generalized sensor circuit configured in accordance with one preferred embodiment of the present invention.

FIG. 1 shows a generalized sensor calibration circuit 100 configured in accordance with one preferred embodiment of the present invention where, as illustrated, a sensor measurement output from a Sensor_m 108 is adjusted with a measurement conditioning signal by being multiplied by ($\alpha M*Vref2-\beta*Vout$), and a sensor reference output from a Sensor_r 118 is adjusted by a reference conditioning signal by being multiplied by ($\alpha R*Vref1-\beta*LIN*Vout$), where:

$\alpha_m$ . . . defined by resistors Ram1 104, Ram2 106 and a variable resistor Ram 102, which is the offset coefficient for the sensor measurement;

$\alpha R$ . . . defined by resistors Rar1 114, Rar2 116 and a variable resistor Rar 112, and is the offset coefficient for the sensor reference measurement;

Vref1 150 . . . reference voltage 1;

Vref2 152 . . . usually equal to Vref1 150;

Vref3 154 . . . usually equal to Vref1 150, or ground;

Vref4 156 . . . usually equal to Vref2 152, or ground;

β . . . defined by resistors Rbeta1 122, Rbeta2 124, and Rlin 126; and variable resistors Rbeta 128; and Rlin_ex 130, and is the gain coefficient; and LIN . . . defined by resistors Rbeta2 124, Rlin 126 and a variable resistor Rlin_ex 130.

In one preferred embodiment of the present invention, variable resistor Rlin_ex 130 is optional and may be used if a more precise calibration of the linearity ('LIN')-coefficient is desired. Further, variable resistor Ram 102, variable resistor Rar 112, variable resistor Rbeta 128, and variable resistor Rlin_ex 130 are laser-trim resistors. Vref1 150 is the voltage of a source voltage, and Vref2 152, Vref3 154, and Vref4 156. Vref 158 is the reference voltage of the signal conditioner. In the embodiment shown in FIG. 2, in one preferred embodiment of the present invention the equivalent reference voltage of Vref 158 is set to 0.2 times the supply voltage (i.e., Vref 158 is set to 1V if Vsupply is 5V).

A signal conditioner 110 receives both the adjusted outputs of the Sensor_m 108 and the Sesnor_r 118 and a reference voltage Vref 158 through a variable resistor RT 120. The signal conditioner 110 provides an output Vout 160. In many applications, $\alpha_M$ can be set to 1.0, hence, in one preferred embodiment of the present invention, resistor Ram1 104, resistor Ram2 106 and variable resistor Ram 102 may be removed and the offset is calibrated by the $\alpha_R$-coefficient. This reduces the need to include these resistors in the manufactured product, as well as the process steps needed to form the resistors and adjust (trim) the variable resistor (i.e., variable resistor Ram 102).

The gain of the circuit is calibrated with the β-coefficient. Variable resistor Rbeta 128 may either be coupled to ground, or to the output voltage Vout 160. If variable resistor Rbeta 128 is connected to ground, as illustrated in the figure, then increasing the resistance value of variable resistor Rbeta 128 reduces gain; if variable resistor Rbeta 128 is connected to Vout, then increasing the resistance value of variable resistor Rbeta 128 increases gain.

It should be noted that, as used herein, "gain" refers to the circuit and is used to adjust the span of the output. Typically, "span" is used in reference to the output signal an, more particularly, to describe the output of a sensor signal. Gain is typically used in circuits to describe the factor by which the signal is adjusted. Specifically, the span of a pressure sensor is the pressure range detectably by the sensor (e.g., 7 to 105 kPA). In one preferred embodiment of the present invention, the "null"-value can be set with the zero-adjust of the circuit ($\alpha_R$) (e.g., the null-value can be set to 7 kPA) and the range can be set with the gain-adjust (1/β). Thus, gain is the circuit parameter to set the span of the sensor.

In one preferred embodiment of the present invention, the linearity correction is multiplied with β. The required linearity correction of many sensors is related to β-LIN. For such sensors, the LIN coefficient can be set to a fixed value and there is no reason to calibrate the LIN coefficient after changing the β-coefficient during the gain calibration process. This significantly simplifies the calibration procedure as otherwise the LIN coefficient will interact with gain.

The temperature compensation aspect of the present invention will now be discussed. There are two major errors induced by changing temperature: a change of the offset of the sensor and associated electronics, and a change of the sensitivity of the sensor and associated electronics. As used herein, the TCZ-coefficient is defined to be the coefficient used to compensate for the offset change due to temperature changes. Similarly, the coefficient to compensate for the sensitivity change due to temperature changes is now defined as the TCS-coefficient.

In one preferred embodiment of the present invention, the variable resistor RT 120 in FIG. 1 is a resistor with a high TC-coefficient. However, if a resistor loads the VT-pin 162, then the signal coming therefrom will become temperature dependent. This provides various ways of temperature compensation. In one preferred embodiment of the present invention, there are two approaches for realizing TCZ-compensation in the general circuit 100 of FIG. 1:

1) by choosing a TC-mismatch between Rar1 114+Rar2 116 and variable resistor Rar 112; or
2) by connecting a resistor between the VT-pin 162 and a reference voltage.

Further, there are also two approaches for realizing TCS-compensation in the general circuit 100 of FIG. 1:

1) by choosing a TC-mismatch between Rbeta1 122+Rbeta2 124 and Rbeta 128; or
2) by connecting a resistor between the VT-pin 162 and the Vout 160.

Preferably, a combination of the above TC-compensation approaches will be chosen. For very special applications it is also possible to connect the LIN input to a temperature dependent network (versus only to resistor Rlin_ex 130), in order to get a temperature dependent linearity correction.

Figure 2:
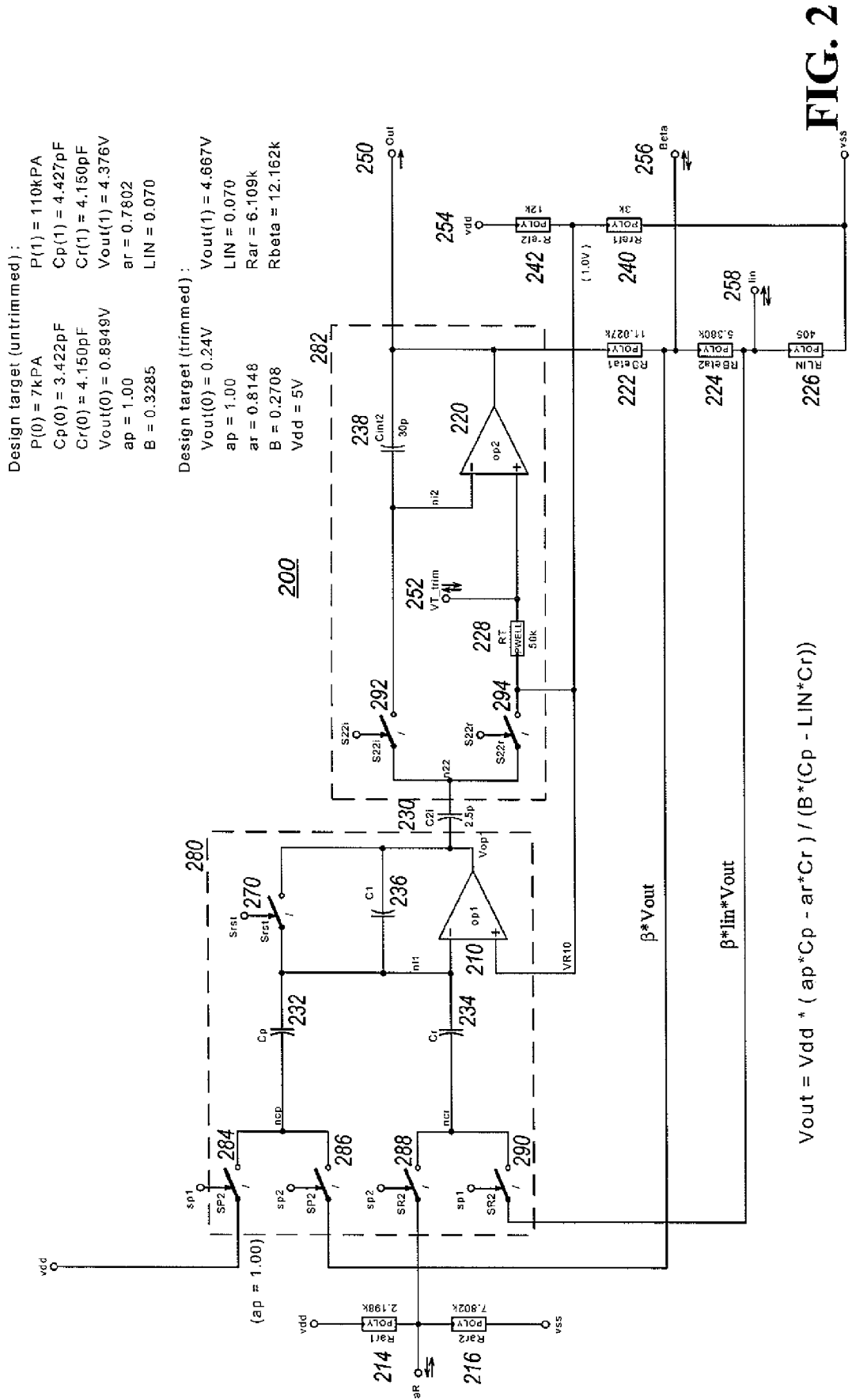
FIG. 2 is a circuit diagram of a sensor circuit configured in accordance with one preferred embodiment of the present invention; and, FIG. 3 is a timing diagram of the operation of the circuit of FIG. 2 configured in accordance with one preferred embodiment of the present invention.

FIG. 2 illustrates a sensor circuit 200 configured in accordance with one preferred embodiment of the present invention that may be implemented as an integrated circuit with off-chip variable resistors Rar and Rbeta (not shown) such as laser-trim resistors. Sensor circuit 200 also includes an integrated pressure dependent capacitor (Cp) 232 and a reference capacitor (Cr) 234. The integrated pressure dependent capacitor Cp 232 is a preferred embodiment of the measurement sensor of the Sensor_m 108 of FIG. 1 and the reference capacitor (Cr) 234 is a preferred embodiment of the reference sensor of the Sensor_r 118 of the same figure.

In one preferred embodiment of the present invention, resistors Rar1 114, Rar2 116, Rbeta1 122, Rbeta2 124 and Rlin 126 of FIG. 1 are now realized as on-chip poly-silicon resistors Rar1 214, Rar2 216, Rbeta1 222, Rbeta2 224 and Rlin 226 in the sensor circuit 200 as such resistors have a relatively low TC (approximately 750 ppm/K). A beta input 256 and a lin input 258 are also provided to adjust the βand LIN, respectively, as necessary.

Figure 3:
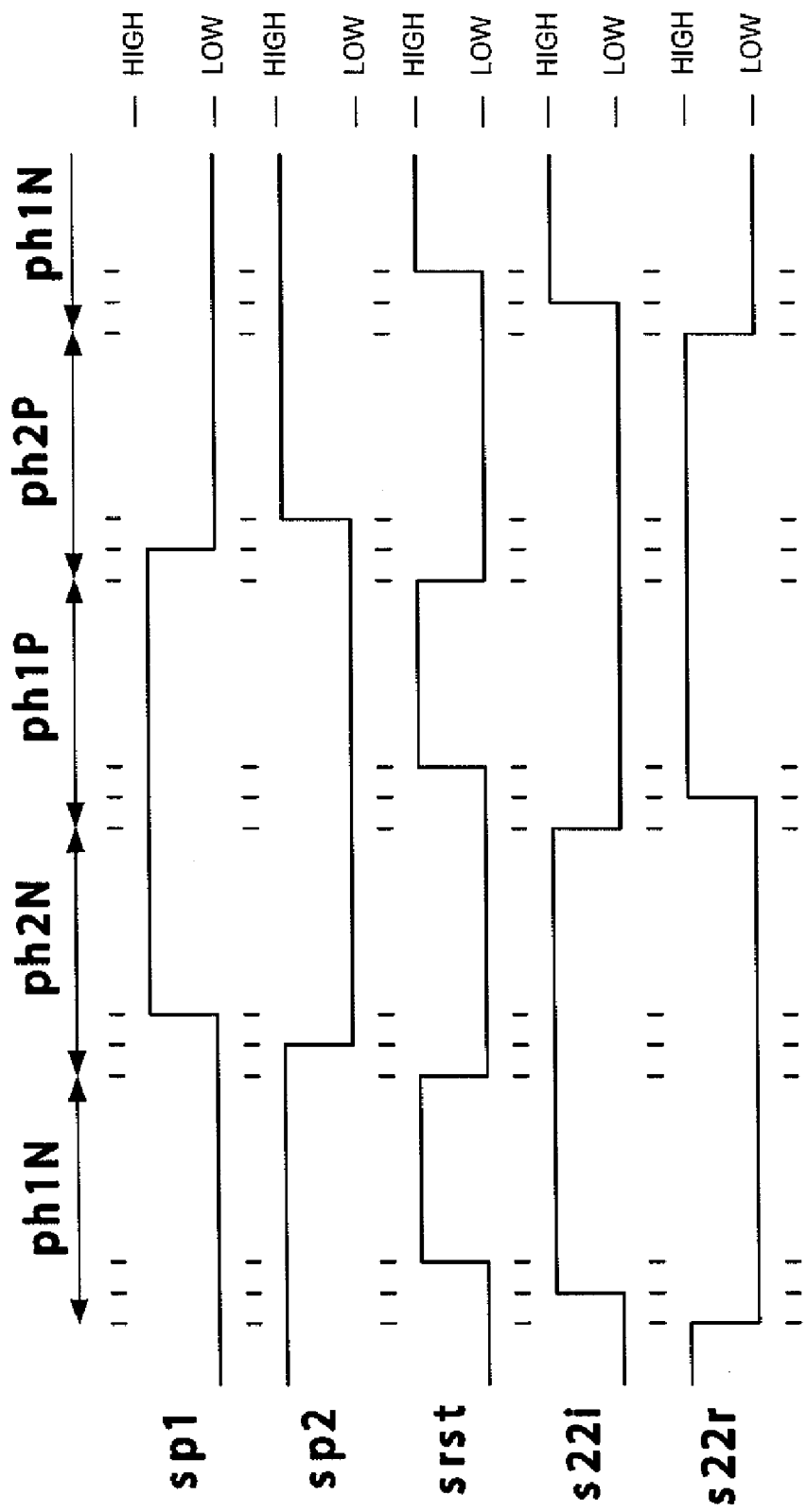

The circuit around the first op-amp (OP1) 210 is a switched-capacitor gain stage. FIG. 3 shows a timing sequence of the switch sequence logic. In one preferred embodiment of the present invention, the timing sequence illustrates that the sensor circuit 200 alternates the sign of both the integrator stage (a first stage 280), as well as the gain stage (a second stage 282) to cancel many non-ideal effects such as offset, clock feed through-induced offset, low frequency noise, long term drift of electronics, etc. In general, there are two (2) clock phases: ph1 and ph2. During phase ph1 the reset switch Srst 270 is closed. In one preferred embodiment of the present invention, during phase ph2 a charge from Cp 232 and Cr 234 is transferred into C1 236. This charge is equal to:

$$\Delta Q = Cr \cdot (\beta \cdot LIN \cdot Vout - \alpha_R \cdot Vdd) + Cp(\alpha_P \cdot vdd - \beta \cdot Vout)$$

If this charge is unequal to zero then it causes a voltage step at the output of OP1 210. The second stage 282 of the sensor circuit 200 in FIG. 2 is a switched-capacitor integrator, which integrates the voltage steps of the first stage 280. When these voltage steps are equal to zero then the circuit is in a so-called "charge balance" state (i.e., $\Delta Q=0$).

In that case:

$$Cr \cdot (\beta \cdot LIN \cdot Vout - \alpha_R \cdot Vdd) + Cp(\alpha_P \cdot vdd - \beta \cdot Vout) = 0$$

Hence:

$$Vout = Vdd \cdot (\alpha_P \cdot Cp - \alpha_R \cdot Cr)/(\beta \cdot Cp - \beta \cdot LIN \cdot Cr).$$

If $\alpha_P=1$ and LIN=0, then:

$$Vout/Vdd = 1/\beta \cdot (Cp - \alpha_R \cdot Cr)/Cp$$

which is the commonly used equation (Cp−Cr)/Cp with offset adjust ($\alpha_R$) and gain adjust ($1/\beta$).

The non-overlapping switch edges (i.e., the spacing between each tick mark in the timing diagram) are about 50 nanoseconds (ns) in width, while the four (4) phases, ph1N, ph2N, ph1P and ph2P, are about 2.5 microseconds (μs) each. A logic "HIGH" in the timing diagram means that the switch-control signal will close the switch. For example, during phase ph1N, switch-signals sp2, srst and s22r are high, so switches SP2 286, SR2 288, Srst 270 and S22r 294 are closed and switches 284 and 290 are open.

The first stage 280 is an integrator stage that is being reset when the switch Srst 270 is closed during phases ph1N and phase ph1P, during when Voltage Vop1(ph1N) is then equal Voff1, which is VR10 plus the offset voltage of OP1 210. Voltage Vop1 is the same during phase ph1P, so Vop1(ph1P) is equal to Vop1(ph1N).

During phase ph2N, the reset switch Srst 270 is opened and node "ncp" is then switched from β·Vout to Vdd 254 and node "ncr" is then switched from αR·Vdd to β·LIN·Vout. This will make voltage Vop1 equal to:

$$Vop1(ph2N) = Cp/C1 \cdot (+\beta \cdot Vout - Vdd) + Cr/C1 \cdot (+\alpha R \cdot Vdd - \beta \cdot LIN \cdot Vout) + Voff1$$

During ph2P, the reset switch Srst 270 is opened and node "ncp" is then switched from Vdd 254 to β·Vout and node "ncr" is then switched from β·LIN·Vout to αR·Vdd. This will make voltage Vop1 equal to:

$$Vop1(ph2P) = Cp/C1 \cdot (-\beta \cdot Vout + Vdd) + Cr/C1 \cdot (-\alpha R \cdot Vdd + \beta \cdot LIN \cdot Vout) + Voff1$$

At the beginning of phase ph1N, switch S22r 294 is opened, whereinafter S22i 292 is closed. This will cause a step of C2i/Cint2·*(VT_trim−VR10) at Vout 250. If there is no load to the VT_trim pin 252 then the value of VR10 subtracted from VT_trim is equal to the offset voltage of the OP2 220. Connecting a resistor between VT_trim and ground (or Vdd 254) will cause a TC effect on the offset (zero) adjust of the system (TC-offset compensation), while connecting a resistor between VT_trim and Vout will cause a TC-effect on the span of the system (TC-span compensation).

Right after switch S22i 292 is closed, still at the beginning of phase ph1N, switch Srst 270 is closed and the difference between Vop1(ph2P) and Vop1(ph1N) will be integrated by the second stage 282. During phase ph2N, switch S22i 292 is kept closed and now the difference between Vop1(ph1N) and Vop1(ph2N) will be integrated. In total, the difference integrated between Vop1(ph2P), which is the Vop1 value at the moment that the switch S22i 292 is closed, and Vop1(ph2N), which is the Vop1 value at the moment that switch S22i 292 is opened. Hence, the voltage change at Vout will be:

$$\Delta Vout = C2i/Cint2 \cdot (Vop1(ph2N) - Vop1(ph2P)) = 2 \cdot C2i/Cint2 \cdot (Cp/C1 \cdot (+\beta \cdot Vout - Vdd) + Cr/C1 \cdot (+\alpha R \cdot Vdd - \beta \cdot LIN \cdot Vout))$$

Note that the term Voff1 is cancelled out, which means that the circuit is insensitive for the offset voltage, low-frequency noise of OP1 210, drift, etc. When Vout equals the target value, then the voltage steps at Vop1 will become zero. So actually, Vop1 is an error signal and if OP1 210 has relative low gain then the error signal will become slightly too small. Hence, the only effect of limited OP1 210 gain is that the settling of Vout will be somewhat slower. In one preferred embodiment of the present invention, a simple single stage operational amplifier will satisfy the requirements of implementing OP1 210. Further, when ΔVout=0 the above equation has the same result as the other equation when ΔQ=0. So when the circuit has settled out, which is the case when ΔVout=0, the above equation can also be re-written.

(Cp+Cr)/C1 and C2i/Cint2 are integrator constants (although Cp is not a constant, but pressure dependent). In one preferred embodiment of the present invention, the combined values of Cp 232 and Cr 234 are less than C1 236; and the value of C2i 230 is less than 15% of Cint2 238. This will avoid too large voltage steps at Vout 250 and provides a good averaging of error effects like noise.

In one preferred embodiment of the present invention, Vout starts at about 1V and settles to its target value. It should be noted that the amplitude of Vop1 reduces in value when Vout gets closer to the target value.

In one preferred embodiment of the present invention, an internal reference voltage of 0.2·Vdd is created using a pair of resistors Rref1 240, Rref2 242. This reference voltage is the reference voltage of Vref 158. In one preferred embodiment of the present invention, resistor RT 228 is created using a CMOS process in a P-well (or N-well) layer. Resistors created this way typically have a relatively high TC value, where the resister is affected greatly by temperature changes. Without a load at the VT-pin, this resistor has no effect. However, if an off-chip resistor, which will have a relative low TC, is coupled to the VT-pin, then it will affect the TC-characteristics as described previously with respect to FIG. 1.

Referring again to FIG. 2, values are shown for typical characteristics of the sensor and electronics. The null-scale pressure P(0) is 7 kPa and the full scale pressure P(1) is 110 kPa. A calibrated system must be insensitive to temperature changes and Vout must be linearly proportional to pressure. Thus, Vout (P=7 kPa)=0.24V and Vout (P=110 kPa)=4.667V.

In one preferred embodiment of the present invention, a 'stand alone' chip is a circuit without the off-chip laser trim resistors Rar 112 and Rbeta 128. The on-chip constants of $\alpha_R$, β and LIN are chosen in such a way that, with practical values for the off-chip Rar 112 and Rbeta 128, the full range of tolerances of sensing element characteristics can be calibrated. The numbers listed in FIG. 2 under "design target (untrimmed) shows some main parameters if Rar 112 and Rbeta 128 are infinite. Under "design target (trimmed)," the parameters are shown after a calibration of $β_R$ and β with the laser-trim resistors in accordance with one preferred embodiment of the present invention.

It should be noted that both the "untrimmed" and the "trimmed" systems have constant linearity while the LIN-coefficient is not changed at all (e.g., LIN=0.07). This is a very important characteristic of a circuit constructed in accordance with the present invention.

The performance of the circuit after calibration can readily compete with the performance of complex high-end pressure systems. However, the results are realized with a simple and low-cost system as configured in accordance with the present invention.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A method for providing calibration of capacitive sensor signals in a capacitive sensor having a capacitive measuring sensor and a capacitive reference sensor, the method comprising:

receiving a capacitive sensor signal and a capacitive reference signal from the capacitive measuring sensor and the capacitive reference sensor, respectively;

generating a first compensation signal to the sensor signal based on a gain characteristic wherein the gain circuit generates an output, Vout, obeying the following equation:

$$V\text{out}=Vdd*(1/β*(Cp-α_R*Cr)/Cp)$$

where:

Cp is a measured capacitance from the capacitive sensor;
Cr is a reference capacitance from the reference sensor;
$α_R$ is an offset component;
β is a gain component; and
Vdd is a supply voltage;

generating a second compensation signal to the reference signal based on the gain characteristic and an offset characteristic;

combining the first compensation signal and the capacitive sensor signal, and the second compensation signal and the capacitive reference signal to create a compensated sensor signal; and, adjusting the compensated signal for temperature effects by coupling a component having a high thermal coefficient to the sensor.

2. The method of claim 1, wherein providing the second compensation signal to the capacitive reference signal is further based on a linearity characteristic.

3. The method of claim 1, wherein combining the first compensation signal and the capacitive sensor signal, and the second compensation signal and the capacitive reference signal to create the compensated sensor signal further comprises combining a temperature characteristic with the compensated sensor signal.

4. The method of claim 1, further comprising adjusting the gain characteristic based on the compensated sensor signal.

5. The method of claim 1, further comprising using the compensated signal as a feedback signal for compensating for temperature effects.

6. A sensing system comprising:
a capacitive sensor;
a reference sensor;
a clock generator;
an integration circuit, the integration circuit coupled to the capacitive sensor and the reference sensor, the integration circuit comprising a plurality of switches controlled by the clock generator to selectively combine a gain component and an offset component with outputs from the capacitive sensor and the reference sensor to generate an integrated output;

a gain circuit, the gain circuit receiving the integrated output, to combine a gain compensation therewith, the gain circuit including a resistor having a low temperature coefficient characteristic;

wherein the gain circuit generates an output, Vout, obeying the following equation:

$$V_{out} = V_{dd} * (1/\beta * (Cp - \alpha_R * Cr)/Cp)$$

where:

Cp is a measured capacitance from the capacitive sensor;
Cr is a reference capacitance from the reference sensor;
$\alpha_R$ is an offset component;
β is a gain component; and
Vdd is a supply voltage.

7. The sensor system of claim 6, wherein the gain circuit further including a component coupled thereto having a low temperature coefficient.

8. The sensor system of claim 6, further comprising a capacitor coupled between the integration circuit and the gain circuit.

9. The sensor system of claim 6, wherein the integration circuit further combines a linearity component with outputs from the capactive sensor and the reference sensor.

10. The sensor system of claim 6, wherein the integration circuit selectively subtracts the gain component and the offset component from the supply voltage Vdd to generate the integrated output.

11. The sensor system of claim 6, wherein the gain circuit further including an input to compensate for temperature.

* * * * *